United States Patent
Jo et al.

(10) Patent No.: US 11,663,131 B2
(45) Date of Patent: May 30, 2023

(54) SYSTEM-ON-CHIP PERFORMING ADDRESS TRANSLATION AND OPERATING METHOD THEREOF

(71) Applicant: Samsung Electronics Co., Ltd., Suwon-si (KR)

(72) Inventors: Seongmin Jo, Seoul (KR); Youngseok Kim, Suwon-si (KR); Chunghwan You, Pyeongtaek-si (KR); Wooil Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/374,076

(22) Filed: Jul. 13, 2021

(65) Prior Publication Data
US 2022/0179793 A1    Jun. 9, 2022

(30) Foreign Application Priority Data

Dec. 3, 2020  (KR) .................. 10-2020-0167331

(51) Int. Cl.
*G06F 12/08*   (2016.01)
*G06F 12/0862* (2016.01)
*G06F 12/10*   (2016.01)

(52) U.S. Cl.
CPC .......... *G06F 12/0862* (2013.01); *G06F 12/10* (2013.01); *G06F 2212/68* (2013.01)

(58) Field of Classification Search
CPC ... G06F 12/0862; G06F 12/10; G06F 2212/68
USPC .......................................... 711/118
See application file for complete search history.

(56) References Cited

U.S. PATENT DOCUMENTS

| | | | |
|---|---|---|---|
| 8,244,978 B2 | 8/2012 | Kegel et al. | |
| 9,378,150 B2 | 6/2016 | Gupta et al. | |
| 9,436,610 B2 | 9/2016 | Ries et al. | |
| 9,645,934 B2 | 5/2017 | Hong et al. | |
| 9,946,652 B2 | 4/2018 | Ries et al. | |
| 10,657,067 B1* | 5/2020 | Azad | G06F 12/1036 |
| 2017/0024145 A1 | 1/2017 | Zghal et al. | |
| 2022/0100653 A1* | 3/2022 | Loh | G06F 12/0802 |

FOREIGN PATENT DOCUMENTS

| | | |
|---|---|---|
| CN | 105808453-8 | 9/2018 |
| KR | 10-2015-0031402 A | 3/2015 |

* cited by examiner

*Primary Examiner* — Hua J Song
(74) *Attorney, Agent, or Firm* — Harness, Dickey & Pierce, P.L.C.

(57) ABSTRACT

An operating method of a system-on-chip includes outputting a prefetch command in response to an update of mapping information on a first read target address, the update occurring in a first translation lookaside buffer storing first mapping information of a second address with respect to a first address, and storing, in response to the prefetch command, in a second translation lookaside buffer, second mapping information of a third address with respect to at least some second addresses of an address block including a second read target address.

20 Claims, 12 Drawing Sheets

SYSTEM-ON-CHIP PERFORMING ADDRESS TRANSLATION AND OPERATING METHOD THEREOF

CROSS-REFERENCE TO RELATED APPLICATION

This application is based on and claims priority under 35 U.S.C. § 119 to Korean Patent Application No. 10-2020-0167331, filed on Dec. 3, 2020, in the Korean Intellectual Property Office, the disclosure of which is incorporated by reference herein in its entirety.

BACKGROUND

1. Field

At least some example embodiments of the inventive concepts relate to a system-on-chip, and more particularly, to a system-on-chip performing address translation.

2. Related Art

A memory management unit (MMU) of a system-on-chip receives mapping information of a physical address with respect to a virtual address from a memory device in which an address translation table is stored, in a process of translating the virtual address to the physical address. It takes a long waiting time to receive mapping information from a memory device each time when an MMU receives a translation request for a virtual address, and system performance is significantly degraded due to the long waiting time.

SUMMARY

At least some example embodiments of the inventive concepts provide an efficient system-on-chip, in which a waiting time for a plurality of memory management units (MMUs) to load mapping information is reduced.

According to at least some example embodiments of the inventive concepts, there is provided an operating method of a system, the operating method including: outputting a prefetch command in response to an update of mapping information on a first read target address, the update occurring in a first translation lookaside buffer circuit storing first mapping information of a second address with respect to a first address; and storing, in response to the prefetch command, in a second translation lookaside buffer circuit, second mapping information of a third address with respect to at least some second addresses of an address block including a second read target address.

According to at least some example embodiments of the inventive concepts, there is provided a system including: a first memory management unit (MMU) circuit configured to output a prefetch command in response to an update of mapping information on a first read target address, the update occurring in a first translation lookaside buffer circuit storing first mapping information of a second address with respect to a first address; and a second MMU circuit configured to store, in response to the prefetch command, second mapping information of a third address with respect to at least some second addresses of an address block including a second read target address.

According to at least some example embodiments of the inventive concepts, there is provided a system-on-chip including: a first translation lookaside buffer circuit storing at least some pieces of first mapping information of a second address with respect to a first address; a second translation lookaside buffer circuit storing at least some pieces of second mapping information of a third address with respect to the second address; a prefetch command generation circuit configured to output a prefetch command in response to receiving update information for updating mapping information of a second target read address with respect to a first read target address, to the first translation lookaside buffer circuit; and a prefetch control logic circuit configured to provide, in response to the prefetch command, a lookup signal with respect to an address block including the second read target address, to the second translation lookaside buffer circuit.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
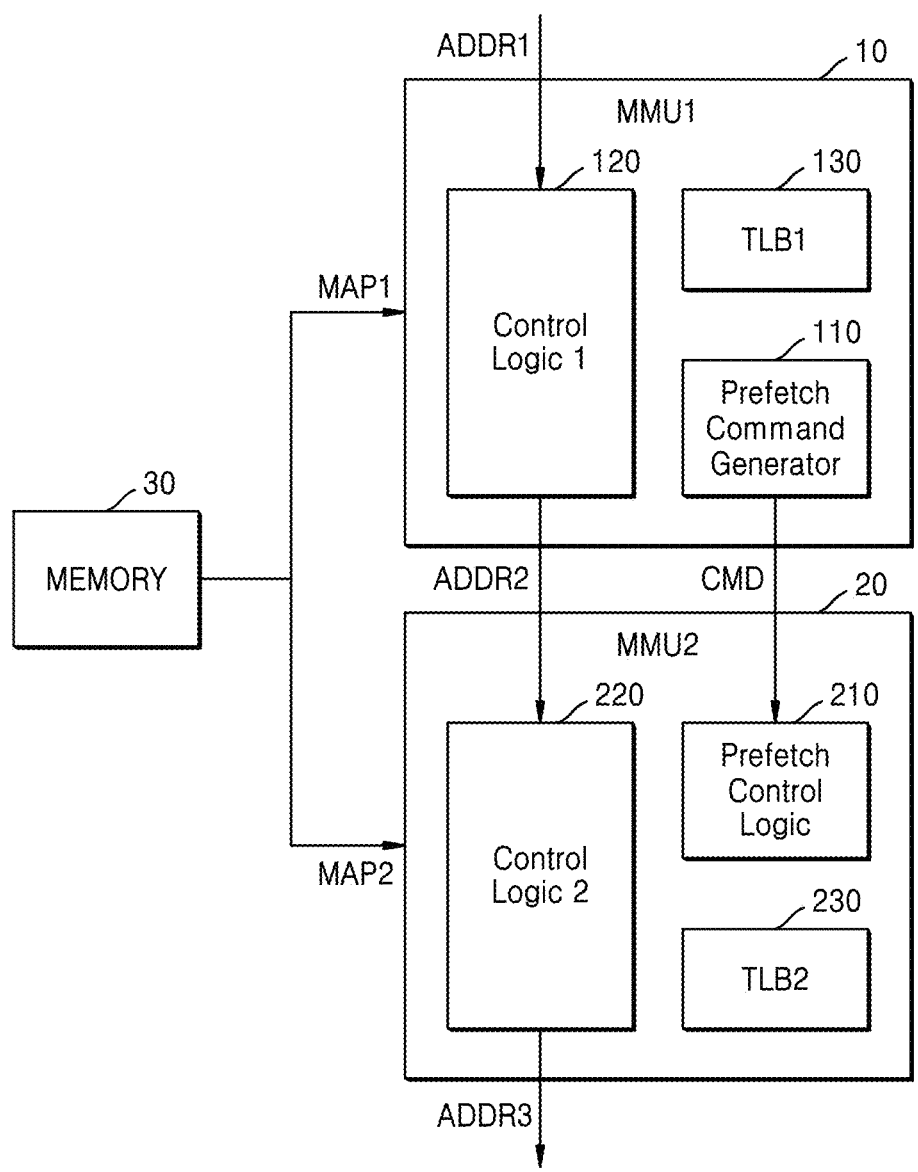
FIG. 1 is a schematic structural block diagram of a system according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a schematic structural block diagram of a system according to at least some example embodiments of the inventive concepts.

Referring to FIG. 1, the system according to at least some example embodiments of the inventive concepts may include a first memory management unit (MMU) 10, a second MMU 20, and a memory device 30. An MMU may generate an address to access a memory storing data, in response to an address access request. According to at least some example embodiments of the inventive concepts, an MMU may receive address mapping information from a memory storing the address mapping information and translate a virtual address, for which access is requested, to a physical address. When there are a plurality of MMUs, each MMU may output a translated address of an address received from another MMU. For example, when the plurality of MMUs include the first MMU 10 and the second MMU 20, the first MMU 10 may receive a virtual address from an external device and generate an intermediate physical address, and the second MMU 20 may receive the intermediate physical address from the first MMU 10 and generate a physical address.

The memory device 30 may store pieces of mapping information respectively corresponding to a plurality of MMUs. Mapping information may be referred to as address translation information, and store, for example, translation information of intermediate physical addresses corresponding to virtual addresses, as a table. The plurality of MMUs may request, from the memory device 30, mapping information about an address to be translated, and each MMU may translate the address by reading the mapping information from the memory device 30.

The first MMU 10 may receive a virtual address, and output an intermediate physical address with respect to the received virtual address. The first MMU 10 may include a first control logic 120 and a first translation lookaside buffer 130, and according to at least some example embodiments of the inventive concepts, may further include a prefetch command generator 110. Any or all of the first control logic 120, the first translation lookaside buffer 130, and the prefetch command generator 110 of the first MMU 10 may be embodied by processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microprocessor, a microcomputer, a field programmable gate array (FPGA), a programmable logic unit, a microprocessor, an application-specific integrated circuit (ASIC), etc. Accordingly, the first control logic 120, the first translation lookaside buffer 130, the prefetch command generator 110, and the first MMU 10 may also be referred to, in the present specification, as first control logic circuit 120, first translation lookaside buffer circuit 130, prefetch command generator circuit 110, and first MMU circuit 10.

The first control logic 120 may request, from the first translation lookaside buffer 130 or the memory device 30, first mapping information MAP1 about a first read target address ADDR1 requested to be translated, and receive the first mapping information MAP1 about the first read target address ADDR1 to generate a second address to be read ADDR2. The first read target address ADDR1 may refer to a virtual address requested to be translated, from among virtual addresses, and the second read target address ADDR2 may indicate an intermediate physical address requested to be translated, from among intermediate physical addresses. Hereinafter, mapping information of an intermediate physical address about a virtual address may be referred to as the first mapping information MAP1.

The first translation lookaside buffer 130 may be a storage region in the first MMU 10 that caches the first mapping information MAP1 about a virtual address. The first control logic 120 of the first MMU 10 may store a portion of the first mapping information MAP1, on which access is concentrated, from the first mapping information MAP1 about a virtual address, in the first translation lookaside buffer 130. The first translation lookaside buffer 130 in which the first mapping information MAP1 is stored will be described in detail later with reference to FIG. 9.

The first MMU 10 according to at least some example embodiments may determine whether the first mapping information MAP1 about the first read target address ADDR1 is stored in the first translation lookaside buffer 130, and determine whether to update the first translation lookaside buffer 130 according to whether the first mapping information MAP1 is stored. When the first MMU 10 determines to update the first translation lookaside buffer 130, the prefetch command generator 110 may generate a prefetch command CMD. When the first translation lookaside buffer 130 is updated with respect to the first read target address ADDR1, the prefetch command CMD may be a command used by the second MMU 20 to update, to a second translation lookaside buffer 230, at least a portion of the second mapping information MAP2 about an address block including the second read target address ADDR2.

The second MMU 20 may receive an intermediate physical address and output a physical address corresponding to received intermediate physical address. The second MMU 20 may include a second control logic 220 and a second translation lookaside buffer 230, and according to at least some example embodiments of the inventive concepts, the second MMU 20 may further include a prefetch control logic 210. Any or all of the second control logic 220, the second translation lookaside buffer 230, and the prefetch control logic 210 of the second MMU 20 may be embodied by processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microprocessor, a microcomputer, a field programmable gate array (FPGA), a programmable logic unit, a microprocessor, an application-specific integrated circuit (ASIC), etc. Accordingly, the second control logic 220, the second translation lookaside buffer 230, the prefetch control logic 210, and the second MMU 20 may also be referred to, in the present specification, as the second control logic circuit 220, second translation lookaside buffer circuit 230, prefetch control logic circuit 210, and second MMU circuit 20. The second control logic 220 may request, from the second translation lookaside buffer 230 or the memory device 30, second mapping information MAP2 about the second read target address ADDR2 received from the first MMU 10, and receive the second mapping information MAP2 about the second read target address ADDR2 to generate a third read target address ADDR3. Like the first translation lookaside buffer 130, the second translation lookaside buffer 230 may store a portion of the second mapping information MAP2, on which access is concentrated, from the second mapping information MAP2. Hereinafter, mapping information of a physical address corresponding to an intermediate physical address may be referred to as the second mapping information MAP2.

The second MMU 20 according to at least some example embodiments may receive a prefetch command CMD generated by the first MMU 10 to generate a prefetch target address, and perform an update on the prefetch target address. The prefetch target address may be an address of the address block including the second read target address ADDR2, wherein the address is determined as necessary to be updated in the second translation lookaside buffer 230. The prefetch control logic 210 may transmit a translation request with respect to the prefetch target address to the second control logic 220, and the second control logic 220 may request from the memory device 30 the second mapping information MAP2 about the prefetch target address. The second control logic 220 that has received the second mapping information MAP2 may update the second mapping information MAP2 about the prefetch target address, to the second translation lookaside buffer 230.

Accordingly, with respect to the system according to at least some example embodiments, in a process of translating a virtual address to a physical address based on a plurality of MMUs, a physical address corresponding to a virtual address, on which access is concentrated, may be previously stored in a translation lookaside buffer, and thus, a waiting time for loading mapping information and performing address translation may be reduced. According to at least some example embodiments of the inventive concepts, a virtual address may be referred to as a first address, an intermediate physical address may be referred to as a second address, and a physical address may be referred to as a third address. Referring to FIG. 1, an embodiment in which the system translates a virtual address to a physical address via the first MMU 10 and the second MMU 20 is described. However, the number of MMUs for translating a virtual address to a physical address is not limited thereto according to at least some example embodiments of the inventive concepts. The system according to at least some example embodiments of the inventive concepts may include three or more MMUs, and some of the plurality of MMUs may include both the prefetch command generator 110 and the prefetch control logic 210 to store mapping information about an address, on which access is concentrated, in a translation lookaside buffer, in advance.

Figure 2:
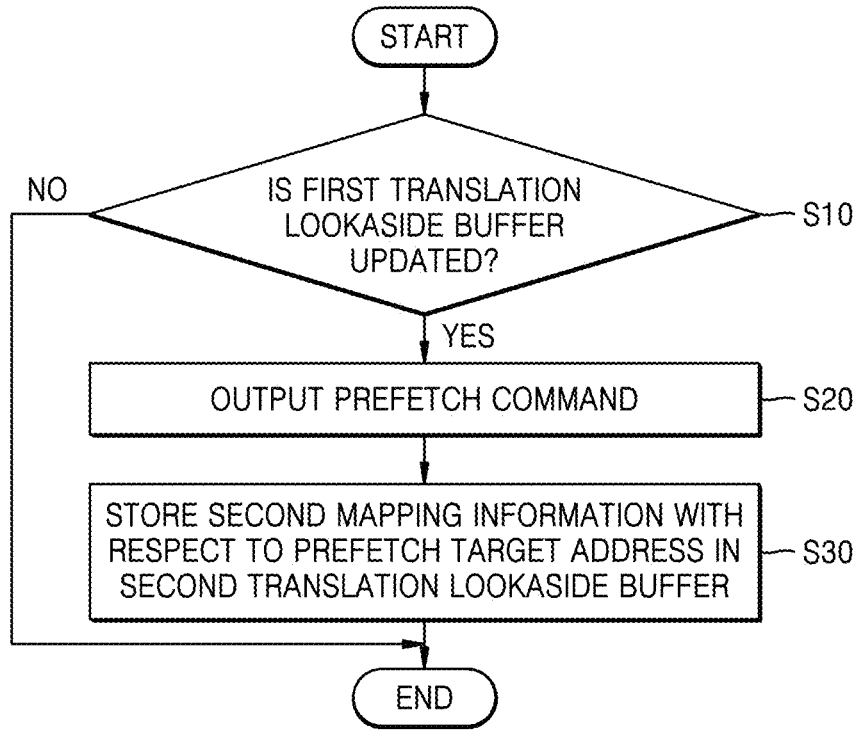
FIG. 2 is a flowchart of an operating method of a system according to at least some example embodiments of the inventive concepts.

FIG. 2 is a flowchart of an operating method of a system according to at least some example embodiments of the inventive concepts.

Referring to FIG. 2, the system according to at least some example embodiments of the inventive concepts may output a prefetch command CMD in response to an update of the first translation lookaside buffer 130, and store the second mapping information MAP2 about a prefetch target address in the second translation lookaside buffer 230 in response to the prefetch command CMD.

In operation S10, the system may determine whether the first translation lookaside buffer 130 is updated. When the first translation lookaside buffer 130 is updated, it may be a case where, when the first MMU 10 of the system receives a translation request for a first read target address ADDR1, the first mapping information MAP1 about the first read target address ADDR1 is not stored in the first translation lookaside buffer 130. That is, when the first MMU 10 is not able to use the first mapping information MAP1 stored in the first translation lookaside buffer 130 to generate the second read target address ADDR2 corresponding to the first read target address ADDR1, and the first mapping information MAP1 about the first read target address ADDR1 is to be received from the memory device 30, the first MMU 10 may update the first mapping information MAP1 about the first read target address ADDR1 read from the memory device 30, to the first translation lookaside buffer 130. In operation S10, when the system has determined that the first translation lookaside buffer 130 does not need to be updated as the first mapping information MAP1 about the first read target address ADDR1 is stored in the first translation lookaside buffer 130, the operation may be ended without outputting a prefetch command CMD.

In operation S20, the system may output a prefetch command CMD in response to an update of the first translation lookaside buffer 130. The system may update the second read target address ADDR2 corresponding to the first read target address ADDR1, to the first translation lookaside buffer 130. For example, the system may update the first translation lookaside buffer 130 by mapping the address block including the second read target address ADDR2, to an address tag corresponding to the first read target address ADDR1. An address tag may be indicator information specifying a location where mapping information about the first read target address ADDR1 is stored in the first translation lookaside buffer 130.

When the system according to at least some example embodiments of the inventive concepts updates an address tag and an address block in the first translation lookaside buffer 130, a prefetch command CMD about the address block may be output to the second MMU 20. The prefetch command CMD about the address block may be a command used to determine whether the second mapping information MAP2 of a physical address corresponding to an intermediate physical address, included in the address block, is stored in the second translation lookaside buffer 230.

In operation S30, in response to output of the prefetch command CMD, the system may store the second mapping information MAP2 about a prefetch target address in the second translation lookaside buffer 230. The prefetch target address may be an address of the address block including the second read target address ADDR2, wherein the address is determined as necessary to be updated in the second translation lookaside buffer 230. The system may determine whether the second mapping information MAP2 about each of a plurality of intermediate physical addresses included in the address block is stored in the second translation lookaside buffer 230. The system may determine an intermediate physical address, of which the second mapping information MAP2 is not stored in the second translation lookaside buffer 230, as a prefetch target address. The system may request, from the memory device 30, the second mapping information MAP2 about the determined prefetch target address, and store the second mapping information MAP2 received in response to the request, in the second translation lookaside buffer 230.

Figure 3:
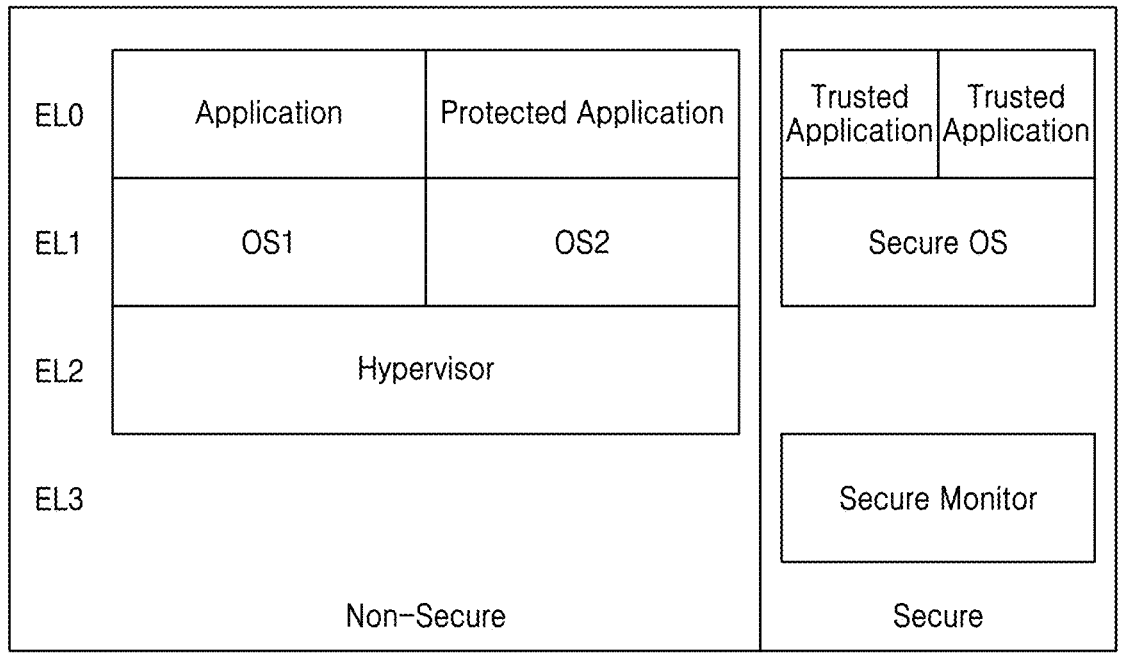
FIG. 3 is a block diagram illustrating an architecture of a system-on-chip including a hypervisor controlling an access right among a plurality of operating systems, according to at least some example embodiments of the inventive concepts.

FIG. 3 is a block diagram illustrating an architecture of a system-on-chip including a hypervisor controlling an access right among a plurality of operating systems, according to at least some example embodiments of the inventive concepts.

Referring to FIG. 3, the architecture of the system-on-chip according to at least some example embodiments of the inventive concepts may include a secure domain requiring a high level of security and a non-secure domain that needs to only satisfy a lower level of security than the secure domain. The architecture of the system-on-chip may be divided into exception levels EL indicating authority levels of respective domains, and the architecture of FIG. 3 may be divided into four levels of exception levels. A level 0-exception level may be a level of a user region in which an actual application operates, and a level 1-exception level may be a level in which an operating system (OS) exists and which functions as a kernel performing, for example, allocation of various devices and memories. A level 2-exception level EL2 included in the non-secure domain is a region including a hypervisor and may control access right between operating systems. A level 3-exception level EL3 included in the secure domain is a level at which a secure monitor exists, and may be a level providing reliable sources in an encoding system.

The system-on-chip according to a comparative example does not use the level 2-exception level EL2 in a mobile or embedded system except for virtualization. However, in a system-on-chip requiring high performance, for example, a neural processing unit (NPU), security requirements are increased, and as it is difficult to meet all security requirements in a secure domain, a virtualization-type security technique using the level 2-exception level EL2 is required. In addition, due to various direct memory access (DMA) devices and attacking models through an external interface, strict authority control over a memory region of a system-on-chip is required, and these requirements led to an EL2 solution based on a hypervisor.

For access control based on the level 2-exception level EL2 in a system-on-chip, in addition to address translation between a virtual address and an intermediate physical address controlled in the existing level 1-exception level EL1, address translation between an intermediate physical address and a physical address controlled at the level 2-exception level EL2 needs be performed. However, as the system-on-chip needs to additionally load mapping information from an address mapping information table to perform address translation at the level 2-exception level EL2, an increase in waiting time due to the loading is caused. That is, when the system-on-chip performs additional address translation, the waiting time may be increased, significantly degrading system performance.

Figure 4:
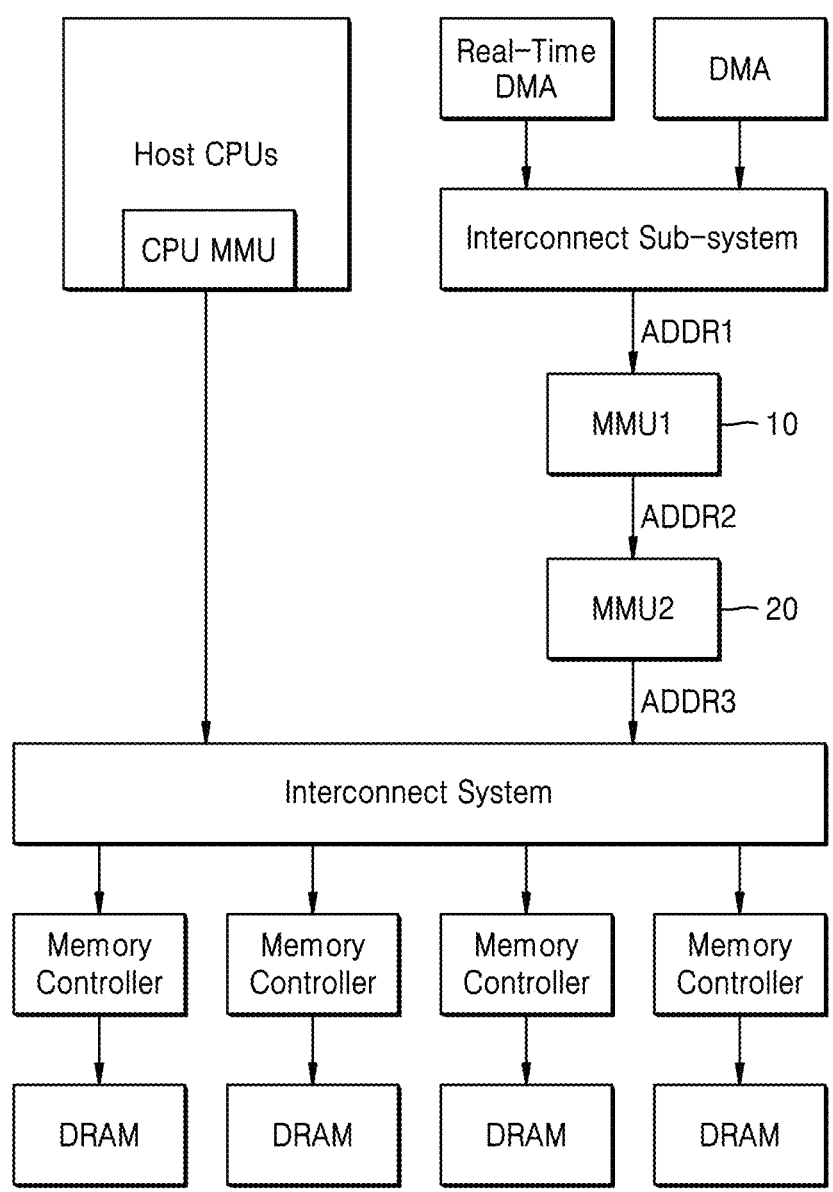
FIG. 4 is a structural block diagram of a system including a plurality of memory management units (MMUs) according to at least some example embodiments of the inventive concepts.

FIG. 4 is a structural block diagram of a system including a plurality of MMUs according to at least some example embodiments of the inventive concepts.

Referring to FIG. 4, a system according to at least some example embodiments of the inventive concepts may include a plurality of MMUs, a host central processing unit (CPU), a DMA device, and a memory controller. In addition, the system may include an interconnect sub-system connecting a plurality of DMA devices to each other and an interconnect system connecting a plurality of memory controllers to each other. For example, the plurality of DMA devices may include real-time DMA devices.

An MMU included in the host CPU may provide a physical address to an interconnect system by translating a virtual address to an intermediate physical address and translating the intermediate physical address to a physical address. The host CPU is a component in which an MMU is embedded, and may be directly connected to the interconnect system to communicate with the memory controllers.

The interconnect sub-system may connect the plurality of DMA devices to each other. The DMA devices may use a virtual address, and at least one DMA device may translate a virtual address to a physical address to communicate with dynamic random access memory (DRAM) memory devices through the interconnect system.

The MMUs of the system may translate a virtual address to a physical address, and according to at least some example embodiments of the inventive concepts, the system may translate a virtual address to a physical address through a plurality of MMUs connected in series. Referring to FIGS. 3 and 4, the first MMU 10 is a component corresponding to the level 1-exception level EL1, and the system may include first MMUs 10 corresponding to the number of operating systems that the system supports. The first MMUs 10 respectively corresponding to the operating systems may receive a virtual address from an application corresponding to the level 0-exception level EL0 and translate the virtual address to an intermediate physical address. The second MMU 20 may receive an intermediate physical address from the first MMUs 10 respectively corresponding to the operating systems and integrate virtual addresses supported by different operating systems into the intermediate physical address. The second MMU 20 may translate an intermediate physical address to a physical address in order to access the at least one DRAM memory device. According to at least some example embodiments of the inventive concepts, when the system includes a plurality of DRAM memory devices, the interconnect system may access a DRAM memory device based on the physical address received from the second MMU 20.

The first MMU 10 may read a mapping information table from the memory device 30 storing address translation information, to translate the virtual address to an intermediate physical address. Here, a waiting time for reading the mapping information with respect to the virtual address requested to be translated may be required for the first MMU 10 to translate address, and the waiting time may lead to latency when translating the virtual address to a physical address. The first MMU 10 according to at least some example embodiments of the inventive concepts may include the first translation lookaside buffer 130 to reduce latency, and the first translation lookaside buffer 130 may store, as a cache, at least some pieces of mapping information with respect to a virtual address, stored in the memory device 30.

The second MMU 20 may read a mapping information table about the intermediate physical address from the memory device 30 to translate the intermediate physical address to a physical address. Like the first MMU 10, the second MMU 20 may need a waiting time for reading mapping information, and the waiting time may lead to system latency. The second MMU 20 according to at least some example embodiments of the inventive concepts may include the second translation lookaside buffer 230 to reduce latency, and the second translation lookaside buffer 230 may store, as a cache, at least some pieces of the mapping information with respect to the intermediate physical address, stored in the memory device 30.

Figure 5:
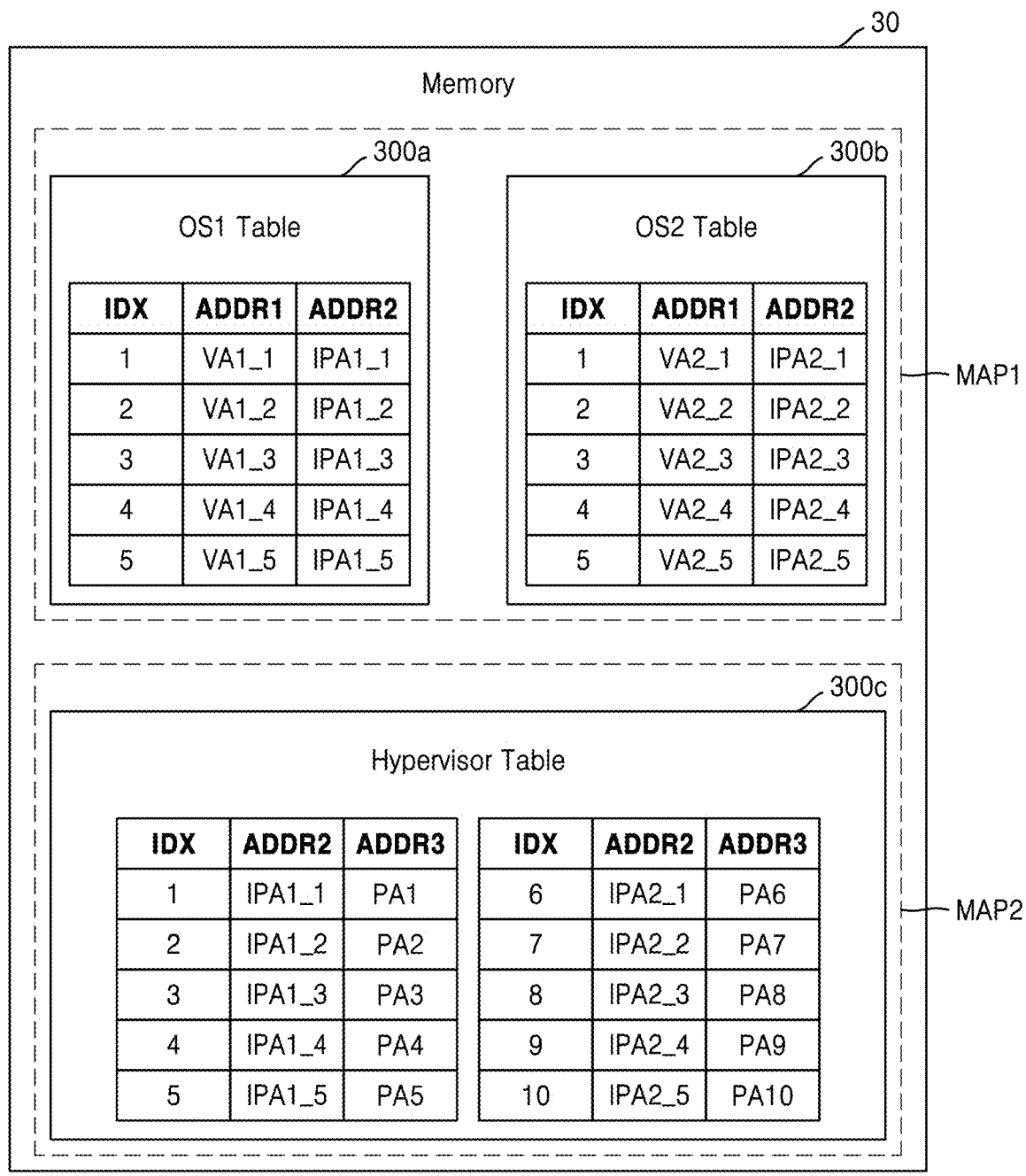
FIG. 5 is a block diagram illustrating a memory device storing address mapping information in a plurality of operating systems, according to at least some example embodiments of the inventive concepts.

FIG. 5 is a block diagram illustrating the memory device 30 storing address mapping information in a plurality of operating systems, according to at least some example embodiments of the inventive concepts.

Referring to FIG. 5, the memory device 30 storing mapping information may include first mapping information MAP1 of an intermediate physical address with respect to a virtual address and second mapping information MAP2 of a physical address with respect to an intermediate physical address. According to at least some example embodiments of the inventive concepts, when there are a plurality of operating systems corresponding to the level 1-exception level EL1, the first mapping information MAP1 for translating from a virtual address to an intermediate physical address may include a plurality of mapping information tables 300a and 300b. That is, the first MMU 10 may differently store the mapping information tables 300a and 300b for each operating system to translate virtual addresses that are different for each operating system, to an intermediate physical address integrated in a hypervisor corresponding to the level 2-exception level EL2. The first MMU 10 may determine whether a virtual address requested to be translated is a virtual address output in accordance with which operating system from among a plurality of operating systems, and may load a table storing mapping information corresponding to that operating system, from the memory device 30, and translate the virtual address to an intermediate physical address.

According to at least some example embodiments of the inventive concepts, the memory device 30 may include a first operating system mapping information table 300a corresponding to a first operating system and a second operating system mapping information table 300b corresponding to a second operating system. The first MMU 10 may determine to which of the first operating system and the second operating system the virtual address requested to be translated corresponds, and may read mapping information corresponding to the virtual address from the first operating system mapping information table 300a or the second operating system mapping information table 300b. For example, when the first MMU 10 receives a virtual address VA2_4, the first MMU 10 may read mapping information corresponding to the virtual address VA2_4 from the second operating system mapping information table 300b of the memory device 30. The first MMU 10 having read the mapping information may translate the virtual address VA2_4 to an intermediate physical address IPA2_4 based on the mapping information and output the same.

The second MMU 20 may receive an intermediate physical address from the first MMU 10, and read the second mapping information MAP2 with respect to the intermediate physical address from the memory device 30. For example, when the second MMU 20 receives the intermediate physical address IPA2_4 from the first MMU 10, the second MMU 20 may read mapping information corresponding to the intermediate physical address IPA_2 from a hypervisor mapping information table 300c of the memory device 30. The second MMU 20 having read the mapping information may translate the intermediate physical address IPA2_4 to a physical address PA9 based on the second mapping information MAP2 and output the same.

An MMU according to at least some example embodiments of the inventive concepts may include a translation lookaside buffer to reduce system latency. When the system includes a plurality of MMUs, each MMU may store at least some pieces of mapping information from the memory device 30 as a cache. For example, the first MMU 10 is an MMU that translates an intermediate physical address from a virtual address, and may store some mapping information having a high access frequency from among pieces of the first mapping information MAP1 stored in the memory device 30. The second MMU 20 is an MMU that translates a physical address from an intermediate physical address, and may store some mapping information having a high access frequency among pieces of the second mapping information MAP2 stored in the memory device 30.

Here, when the first MMU 10 of the system updates the first mapping information MAP1 to the first translation lookaside buffer 130, the first translation lookaside buffer 130 may be updated in units of address blocks including an intermediate physical address. An address block may include peripheral addresses of an intermediate physical address, and may include addresses having a high possibility of being requested to be translated in a subsequent address translation. When updating the second translation lookaside buffer 230, the second MMU 20 according to the comparative example may store only mapping information with respect to an intermediate physical address requested to be translated, and the remaining addresses except for the intermediate physical address of an address block may not be updated because they are not requested to be translated. That is, when the second MMU 20 receives a translation request for addresses other than the intermediate physical address of the address block, mapping information corresponding to the other addresses may not be stored in the second translation lookaside buffer 230, and thus, the second MMU 20 is to request, from the memory device 30, the mapping information. Accordingly, the system according to the comparative example does not store mapping information with respect to an address block that is highly likely to be accessed in a subsequent address translation process, and thus, the latency of the system may increase.

Figure 6:
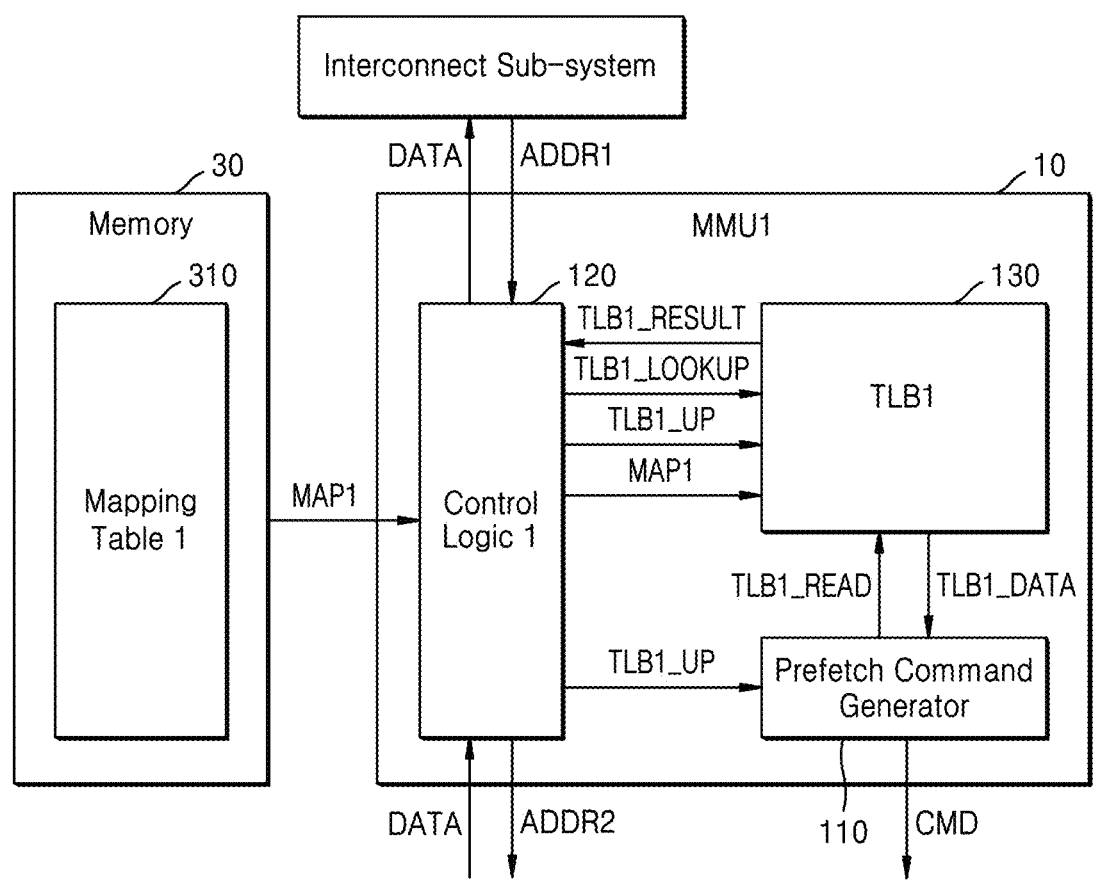
FIG. 6 is a block diagram illustrating a first memory management unit (MMU) according to at least some example embodiments of the inventive concepts.

FIG. 6 is a block diagram illustrating the first MMU 10 according to at least some example embodiments of the inventive concepts.

Referring to FIG. 6, when receiving a translation request for the first read target address ADDR1, the first MMU 10 may provide a translation request for the second read target address ADDR2 to the second MMU 20. The first MMU 10 according to at least some example embodiments of the inventive concepts may provide a prefetch command CMD to the second MMU 20 separately from the translation request for the second read target address ADDR2.

The first MMU 10 according to at least some example embodiments of the inventive concepts may include the prefetch command generator 110, the first control logic 120, and the first translation lookaside buffer 130. The first MMU 10 may receive the first read target address ADDR1 from an interconnect sub-system, and may output the second read target address ADDR2 based on the first mapping information MAP1 with respect to the received first read target address ADDR1. The first control logic 120 may perform a lookup operation on the received first read target address ADDR1 and may receive a result of the lookup operation. The lookup operation may refer to an operation of determining whether the first mapping information MAP1 with respect to the received first read target address ADDR1 is stored in the first translation lookaside buffer 130. For example, the first control logic 120 may output a lookup signal TLB1_LOOKUP to the first translation lookaside buffer 130, and receive result information TLB1_RESULT based on the lookup signal TLB1_LOOKUP to determine whether the first mapping information MAP1 is stored in the first translation lookaside buffer 130.

When it is determined from the first translation lookaside buffer 130 that the first mapping information MAP1 with respect to the first read target address ADDR1 is stored in the first translation lookaside buffer 130, the first control logic 120 may load the first mapping information MAP1 from the first translation lookaside buffer 130 to generate the second read target address ADDR2. The first control logic 120 may transmit the generated second read target address ADDR2 to the second MMU 20, and by receiving data DATA from at least one memory cell accessed based on the second read target address ADDR2, the first control logic 120 may transmit the data DATA to the interconnect sub-system.

When the first control logic 120 determines that the first mapping information MAP1 is not stored in the first translation lookaside buffer 130, the first control logic 120 may receive the first mapping information MAP1 from the memory device 30 to output the second read target address ADDR2. The first control logic 120 that has received the first mapping information MAP1 from the memory device 30 may transmit update information TLB1_UP related to the first mapping information MAP1, to the first translation lookaside buffer 130. The update information TLB1_UP may include the first mapping information MAP1 with respect to the first read target address ADDR1 requested to be translated, in the first translation lookaside buffer 130, and when available space to store the first mapping information MAP1 in the first translation lookaside buffer 130 is insufficient, the first control logic 120 may store the first mapping information MAP1 instead of any one piece of existing mapping information. That is, the first control logic 120 may perform an update operation in response to a case in which the first mapping information MAP1 with respect to the first read target address ADDR1 requested to be translated does not exist in the first translation lookaside buffer 130, and may not perform an update operation when the first mapping information MAP1 is stored. According to at least some example embodiments of the inventive concepts, the first control logic 120 may map, to an address tag, an address block including the second read target address ADDR2 with respect to the first read target address ADDR1 requested to be translated, and store the mapped address block and the address tag in the first translation lookaside buffer 130. An embodiment in which the first control logic 120 maps an address block to an address tag and stores the mapped address block and the address tag in the first translation lookaside buffer 130 will be described in detail later with reference to FIG. 9.

The prefetch command generator 110 may receive the update information TLB1_UP from the first control logic 120. The prefetch command generator 110 may generate a prefetch command CMD in response to receiving the update information TLB1_UP. When the first control logic 120 determines that it is not necessary to perform an update operation on the first translation lookaside buffer 130, the prefetch command generator 110 does not provide the update information TLB1_UP, and accordingly, the prefetch command generator 110 may not output the prefetch command CMD. The prefetch command generator 110 that has received the update information TLB1_UP may output a first mapping information read signal TLB1_READ with respect to the first read target address ADDR1, to the first translation lookaside buffer 130, and the first translation lookaside buffer 130 that has received the first mapping information read signal TLB1_READ may provide updated first mapping information MAP1 to the prefetch command generator 110 as first mapping information read data TLB1_DATA. Accordingly, the prefetch command generator 110 may generate a prefetch command CMD with respect to the updated first mapping information MAP1. According to at least some example embodiments of the inventive concepts, the prefetch command generator 110 may receive an address block mapped to an address tag as the first mapping information read data TLB1_DATA, and output a prefetch command CMD with respect to the address block.

Figure 7:
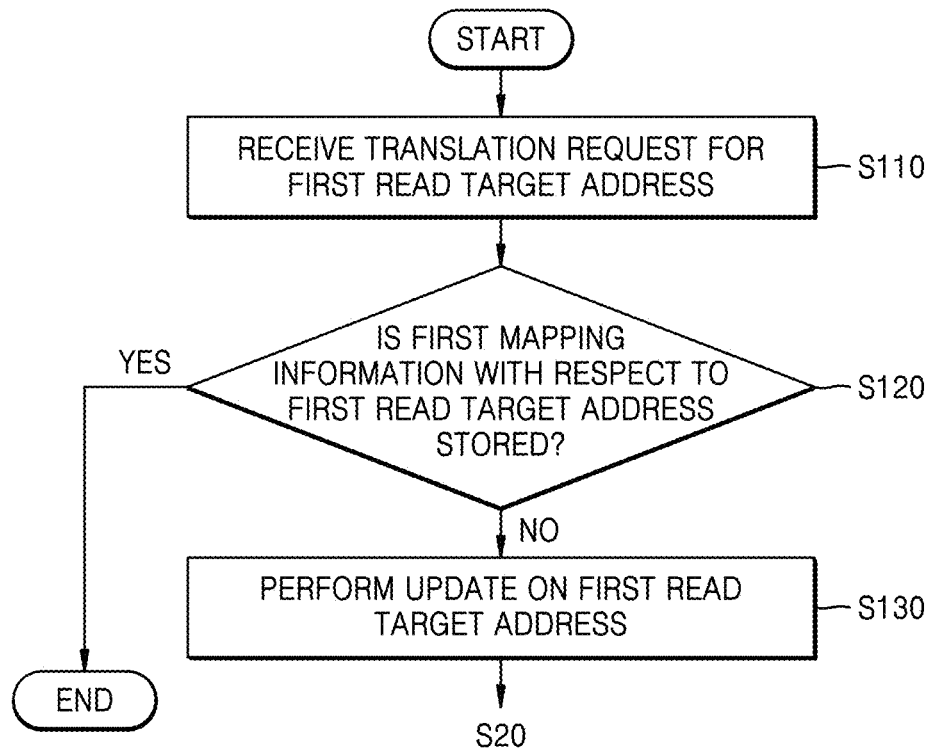
FIG. 7 is a flowchart of a method of performing, by the first MMU according to at least some example embodiments of the inventive concepts of FIG. 6, an update.

FIG. 7 is a flowchart of a method of performing, by the first MMU 10 according to at least some example embodiments of the inventive concepts of FIG. 6, an update.

According to at least some example embodiments of the inventive concepts, the first MMU 10 may generate a prefetch command CMD in response to performing an update operation, and when not performing an update operation, the first MMU 10 may not generate a prefetch command CMD but perform an address translation operation.

In operation S110, the first MMU 10 may receive a translation request with respect to the first read target address ADDR1 together with the first read target address ADDR1 from an external device. The first read target address ADDR1 may be an address to be accessed to receive data from a memory such as DRAM, or may be a virtual address before being translated to a physical address.

In operation S120, the first MMU 10 may determine whether the first mapping information MAP1 with respect to the first read target address ADDR1 is stored in the first translation lookaside buffer 130. The first mapping information MAP1 with respect to the first read target address ADDR1 may be data to which the first read target address ADDR1 and the second read target address ADDR2 are mapped by the first MMU 10. According to at least some example embodiments of the inventive concepts, when the first mapping information MAP1 is stored in the first translation lookaside buffer 130, the first translation lookaside buffer 130 may store information including an address tag that corresponds to the first read target address ADDR1 and is mapped to an address block including the second read target address ADDR2, as the first mapping information MAP1. When the first mapping information MAP1 is stored in the first translation lookaside buffer 130, the first control logic 120 may load the first mapping information MAP1 from the first translation lookaside buffer 130, thereby translating the first read target address ADDR1 to the second read target address ADDR2. Here, as the first translation lookaside buffer 130 does not need to update the first mapping information MAP1, the first control logic 120 may complete the address translation operation without performing an update operation.

In operation S130, the first MMU 10 may perform an update operation when the first mapping information MAP1 is not stored in the first translation lookaside buffer 130. The first MMU 10 may store the first mapping information MAP1 with respect to the first read target address ADDR1 in the first translation lookaside buffer 130, or when the available space in the first translation lookaside buffer 130 is insufficient, the first MMU 10 may perform an update operation by replacing the first mapping information MAP1 with respect to the first read target address ADDR1 instead of other mapping information. According to at least some example embodiments of the inventive concepts, the first control logic 120 may perform an update operation by using information including an address tag that corresponds to the first read target address ADDR1 and is mapped to an address block including the second read target address ADDR2, as first mapping information MAP1.

Figure 8:
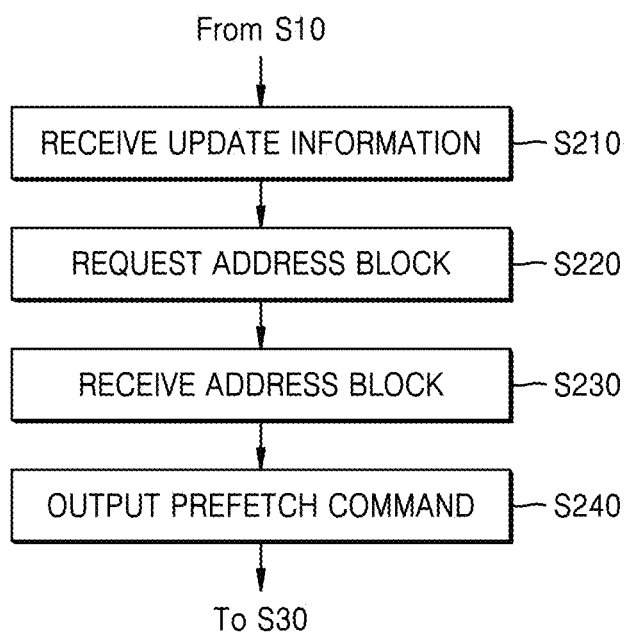
FIG. 8 is a flowchart of a method of outputting, by the first MMU according to at least some example embodiments of the inventive concepts of FIG. 6, a prefetch command.

FIG. 8 is a flowchart of a method of outputting, by the first MMU 10 according to at least some example embodiments of the inventive concepts of FIG. 6, a prefetch command CMD.

Referring to FIG. 8, when performing an update operation on the first mapping information MAP1, the first MMU 10 may output a prefetch command CMD. In operation S210, the prefetch command generator 110 may receive update information from the first control logic 120. When performing an update operation, the first control logic 120 may provide the first read target address ADDR1 to be updated and the first mapping information MAP1 with respect to the first read target address ADDR1, to the first translation lookaside buffer 130. The first control logic 120 may transmit, to the prefetch command generator 110 as update information, a trigger signal indicating that an update operation is performed, while providing the first mapping information MAP1 to the first translation lookaside buffer 130. In addition, according to at least some example embodiments of the inventive concepts, the first control logic 120 may include at least one of the first read target address ADDR1 and the first mapping information MAP1 with respect to the first read target address ADDR1, as update information, and transmit the update information to the prefetch command generator 110.

In operation S220, the prefetch command generator 110 may request, from the first translation lookaside buffer 130, an address block for generating a prefetch command CMD in response to receiving the trigger signal indicating that the update operation is performed. The prefetch command generator 110 may request, from the first translation lookaside buffer 130, an address block with respect to a recently updated virtual address. Here, when the first control logic 120 updates the first translation lookaside buffer 130 by matching an address tag to an address block, the prefetch command generator 110 may request the address block corresponding to a recently updated address tag.

In operation S230, the prefetch command generator 110 may receive the recently updated address block from the first translation lookaside buffer 130. That is, the prefetch command generator 110 may monitor an update event in the first MMU 10 and read the monitored recent update information from the first translation lookaside buffer 130 to receive the address block corresponding to the address tag.

In operation S240, the prefetch command generator 110 may output a prefetch command CMD instructing to perform a prefetch operation on the address block received from the first translation lookaside buffer 130. That is, the prefetch command generator 110 may instruct the second MMU 20 to perform a prefetch operation on intermediate physical addresses in which an update is conducted.

Figure 9:
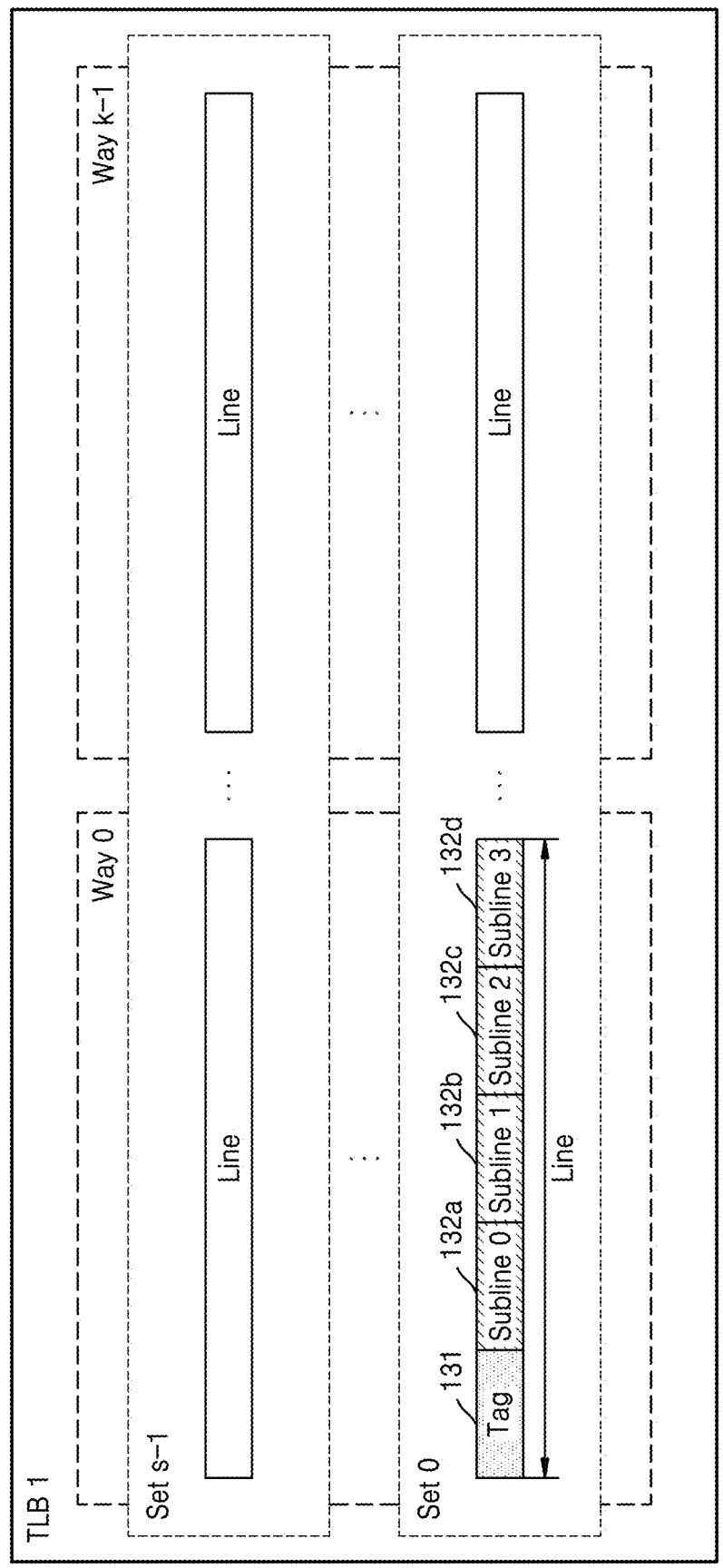
FIG. 9 is a diagram illustrating mapping information stored in a first translation lookaside buffer according to at least some example embodiments of the inventive concepts.

FIG. 9 is a diagram illustrating mapping information stored in the first translation lookaside buffer 130 according to at least some example embodiments of the inventive concepts.

Referring to FIG. 9, the first translation lookaside buffer 130 may store caches in a set-associative manner. A cache may include data read in units of lines, from the memory device 30 in which mapping information is stored, and may be a data block in which data in units of lines is mapped to a tag. The first control logic 120 or the prefetch command generator 110 may specify an address block to be read from the first translation lookaside buffer 130 based on an address tag 131. The first translation lookaside buffer 130 in which caches are stored in a set-associative manner may store a plurality of lines in each set. Address tags 131 of lines included in a same set may be partially identical, and the first control logic 120 may distinguish a set corresponding to the first read target address ADDR1 based on the same tag portion of each set. When the first control logic 120 distinguishes a set corresponding to the first read target address ADDR1, a cache line may be specified based on the remaining tag portions.

The specified cache line may include a plurality of sub-lines 132a through 132d, and each sub-line may have data corresponding to an intermediate physical address. The first control logic 120 may select one of the plurality of sub-lines 132a through 132d to load the second read target address ADDR2 corresponding to the first read target address ADDR1, and may determine the second read target address ADDR2 corresponding to the first read target address ADDR1 from among the plurality of sub-lines 132a through 132d based on the address tag 131. That is, the first control logic 120 may select one of a plurality of sets based on the address tag 131, and select any one of a plurality of lines included in the selected set, and determine any one of the plurality of sub-lines 132a through 132d as the second read target address ADDR2. The address tag 131 may be data corresponding to the first read target address ADDR1, but the at least some example embodiments of the inventive concepts are not limited thereto, and the address tag 131 may also be a data block generated from the first read target address ADDR1.

According to at least some example embodiments of the inventive concepts of FIG. 9, when the address tag 131 specifies a cache line corresponding to a 0th set (Set0) and a 0th way (Way0), and the first read target address ADDR1 indicates a first sub-line 132b from among a four sub-lines, that is, the zeroth sub-line 132a to the third sub-line 132d, included in the specified cache line, the first control logic 120 may output the second read target address ADDR2 with respect to the first read target address ADDR1 as data corresponding to the first sub-line 132b.

When the first MMU 10 according to at least some example embodiments of the inventive concepts performs an update operation, the first control logic 120 may determine whether a cache line corresponding to the address tag 131 is stored in the first translation lookaside buffer 130. When there is no cache line corresponding to the address tag 131 in the first translation lookaside buffer 130, the first control logic 120 may update a cache line corresponding to the address tag 131 from the memory device 30, to the first translation lookaside buffer 130. Here, as the first control logic 120 updates the first mapping information MAP1 to the first translation lookaside buffer 130 in units of cache lines, the address block including the second read target address ADDR2 may be updated to the first translation lookaside buffer 130. For example, when the second read target address ADDR2 corresponding to the first sub-line 132b is updated to the first translation lookaside buffer 130, the first control logic 120 may update the address block including the zeroth sub-line 132a, the second sub-line 132c, and the third sub-line 132d, together with the first sub-line 132b, to the first translation lookaside buffer 130.

The first MMU 10 according to the comparative example may not generate a prefetch command CMD, and provide only one of intermediate physical addresses corresponding to the plurality of sub-lines 132a through 132d, to the second MMU 20. Accordingly, the second MMU 20 may only store the second mapping information MAP2 with respect to any one of the plurality of sub-lines 132a through 132d in the second translation lookaside buffer 230, and the second mapping information MAP2 with respect to the remaining intermediate physical addresses that are not output as the second read target address ADDR2 may not be stored in the second translation lookaside buffer 230. As the system needs to obtain the second mapping information MAP2 from the memory device 30 in a subsequent address translation process, the latency of address translation may increase.

In contrast, the first MMU 10 according to at least some example embodiments of the inventive concepts may generate a prefetch command CMD with respect to the remaining intermediate physical addresses that are not output as the second read target address ADDR2 from among the plurality of sub-lines 132a through 132d. The second MMU 20 may receive the prefetch command CMD and obtain the second mapping information MAP2 with respect to the remaining intermediate physical addresses from the memory device 30 in advance, and store the second mapping information MAP2 in the second translation lookaside buffer 230, and may load the second mapping information MAP2 stored in the second translation lookaside buffer 230 in a subsequent address translation process, and accordingly, the latency of address translation may be reduced, compared to the comparative example.

Figure 10:
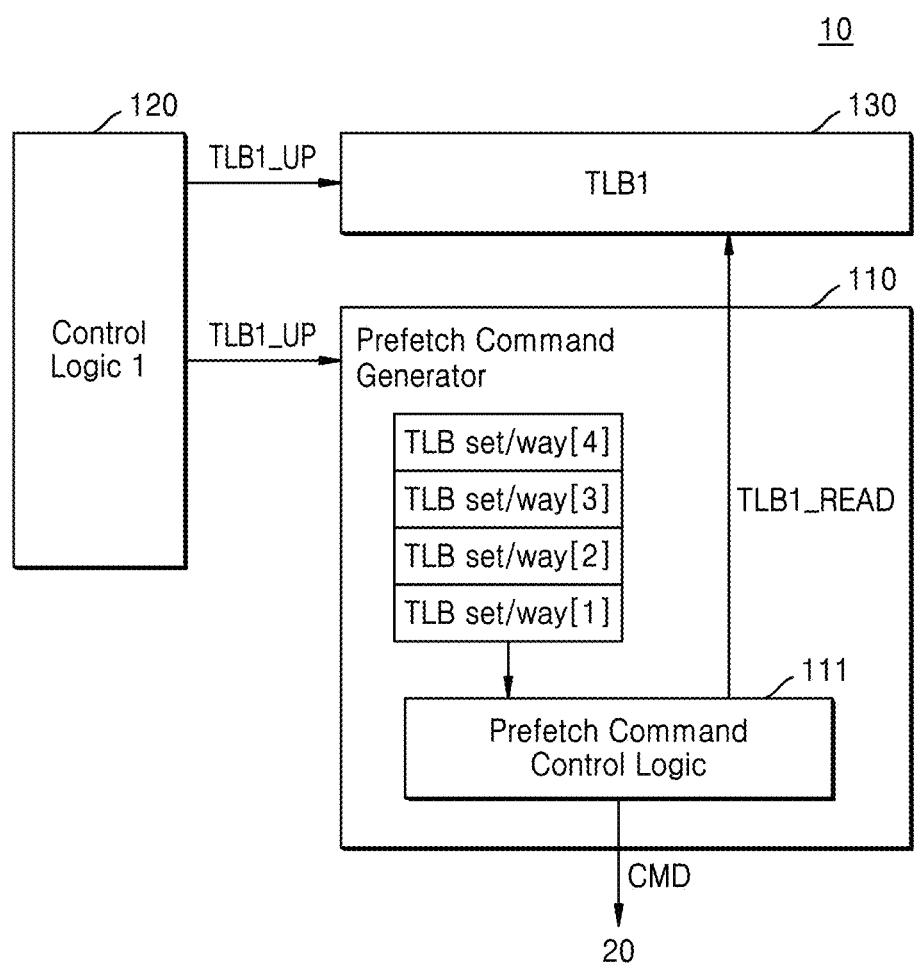
FIG. 10 is a block diagram of a configuration of generating a prefetch command with respect to a plurality of address blocks, according to at least some example embodiments of the inventive concepts.

FIG. 10 is a block diagram of a configuration of generating a prefetch command CMD with respect to a plurality of address blocks, according to at least some example embodiments of the inventive concepts.

Referring to FIG. 10, the prefetch command generator 110 may further include a prefetch command control logic 111 and may receive a series of first read target addresses ADDR1. According to at least some example embodiments of the inventive concepts, the system may detect an address pattern having a high access frequency, and store pieces of the first mapping information MAP1 with respect to a series of the first read target addresses ADDR1 corresponding to the address pattern in the first translation lookaside buffer 130.

The prefetch command control logic 111 may receive a plurality of address tags respectively corresponding to the series of first read target addresses ADDR1 from the first control logic 120 and request from the first translation lookaside buffer 130 address blocks corresponding to the plurality of address tags. The prefetch command control logic 111 that has received a series of address blocks from the first translation lookaside buffer 130 may generate a prefetch command CMD for the address blocks.

In addition, when the first MMU 10 according to at least some example embodiments of the inventive concepts has performed an update operation a plurality of times, the first MMU 10 may provide the address tags to the prefetch command control logic 111 in an order in which the update operations are performed, and the prefetch command control logic 111 may request from the first translation lookaside buffer 130 address blocks respectively corresponding to address tags. The prefetch command control logic 111 may generate the prefetch commands CMD in an order of the received address blocks and provide them to the second MMU 20.

Figure 11:
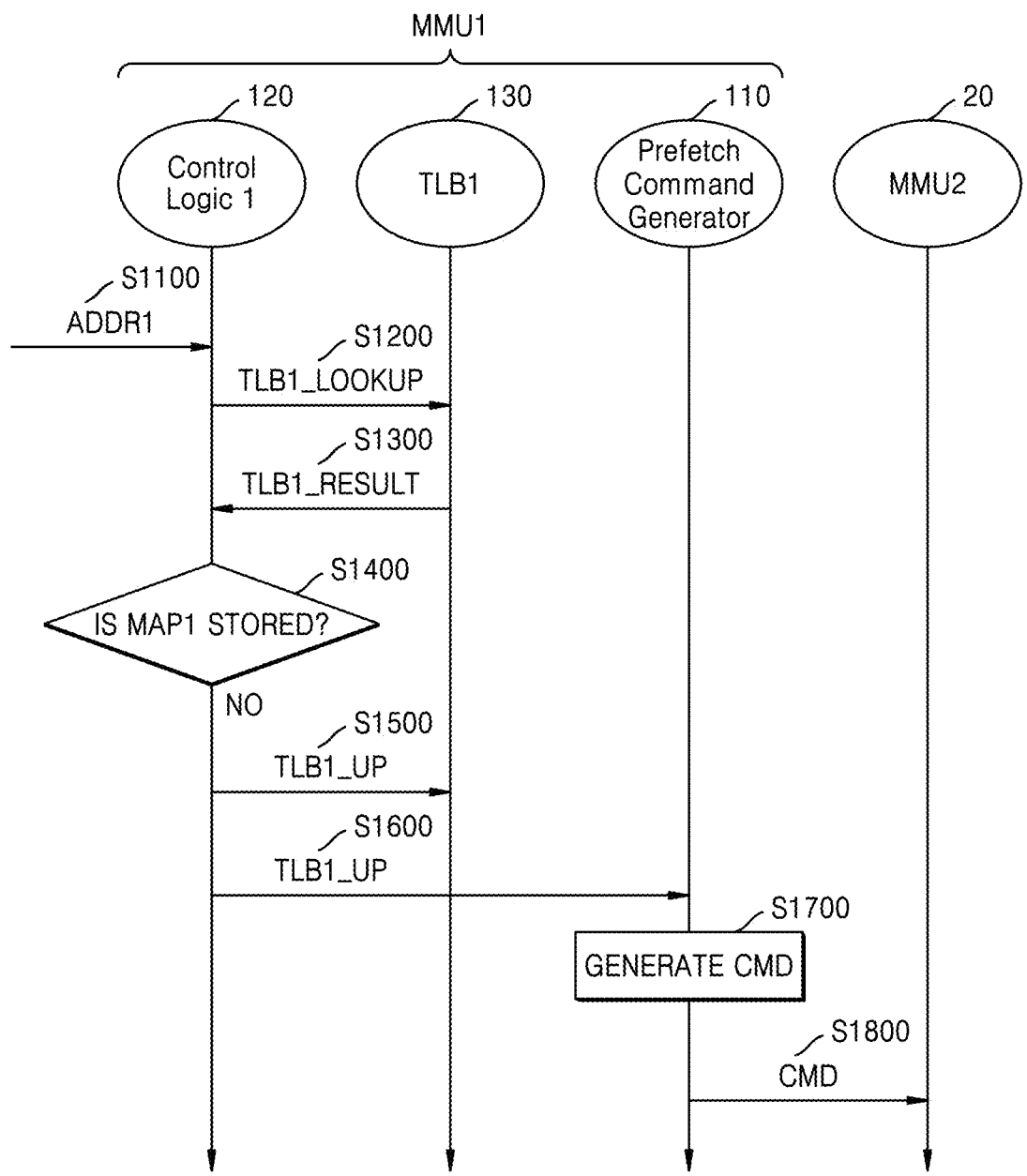
FIG. 11 is a flowchart of a method of outputting, by the first MMU, a prefetch command, according to at least some example embodiments of the inventive concepts.

FIG. 11 is a flowchart of a method of outputting, by the first MMU, a prefetch command CMD, according to at least some example embodiments of the inventive concepts.

Referring to FIG. 11, in response to receiving a translation request for the first read target address ADDR1, the first MMU 10 may generate a prefetch command CMD and provide the prefetch command CMD to the second MMU 20. In operation S1100, the first control logic 120 may receive the first read target address ADDR1 from an external device and receive a translation request with respect to the first read target address ADDR1. In operation S1200, the first control logic 120 may transmit a lookup signal TLB1_LOOKUP with respect to the first read target address ADDR1 requested to be translated, to the first translation lookaside buffer 130. The lookup signal TLB1_LOOKUP with respect to the first read target address ADDR1 may be a signal used to detect whether the first mapping information MAP1 with respect to the first read target address ADDR1 is stored in the first translation lookaside buffer 130. According to at least some example embodiments of the inventive concepts, an address tag corresponding to the first read target address ADDR1 may be provided as the lookup signal TLB1_LOOKUP to the first translation lookaside buffer 130.

In operation S1300, the first control logic 120 may receive lookup result information TLB1_RESULT from the first translation lookaside buffer 130. The lookup result information TLB1_RESULT may be information indicating whether the first mapping information MAP1 with respect to the first read target address ADDR1 is stored in the first translation lookaside buffer 130. For example, when the first mapping information MAP1 with respect to the first read target address ADDR1 is stored in the first translation lookaside buffer 130, the first control logic 120 may receive a loop up hit result via the lookup result information TLB1_RESULT, and when the first mapping information MAP1 with respect to the first read target address ADDR1 is not stored, the first control logic 120 may receive a lookup miss result via the lookup result information TLB1_RESULT.

In operation S1400, the first control logic 120 may determine whether the first mapping information MAP1 is stored in the first translation lookaside buffer 130 based on the received lookup result information. When it is determined that the first mapping information MAP1 is stored in the first translation lookaside buffer 130, the first control logic 120 may end an address translation operation without performing an update operation. When the first control logic 120 determines that the first mapping information MAP1 is not stored in the first translation lookaside buffer 130, the first control logic 120 may provide the update information TLB1_UP to the first translation lookaside buffer 130 in operation S1500, and provide the update information TLB1_UP to the prefetch command generator 110 in operation S1600. The update information TLB1_UP may include the first mapping information MAP1 received from the memory device 30 in which pieces of mapping information of intermediate physical addresses with respect to virtual addresses are stored.

In operation S1700, the prefetch command generator 110 that has received the update information TLB1_UP may generate a prefetch command CMD. The prefetch command generator 110 may receive the first mapping information MAP1 with respect to the first read target address ADDR1 directly from the first control logic 120, or may also obtain the first mapping information MAP1 by requesting from the first translation lookaside buffer 130 the first mapping information MAP1 in which an event has recently occurred. According to at least some example embodiments of the inventive concepts, the first mapping information MAP1 may include an address block including a plurality of intermediate physical addresses including the second read target address ADDR2. In operation S1800, the prefetch command generator 110 may provide the prefetch command CMD with respect to the address block, to the second MMU 20.

Figure 12:
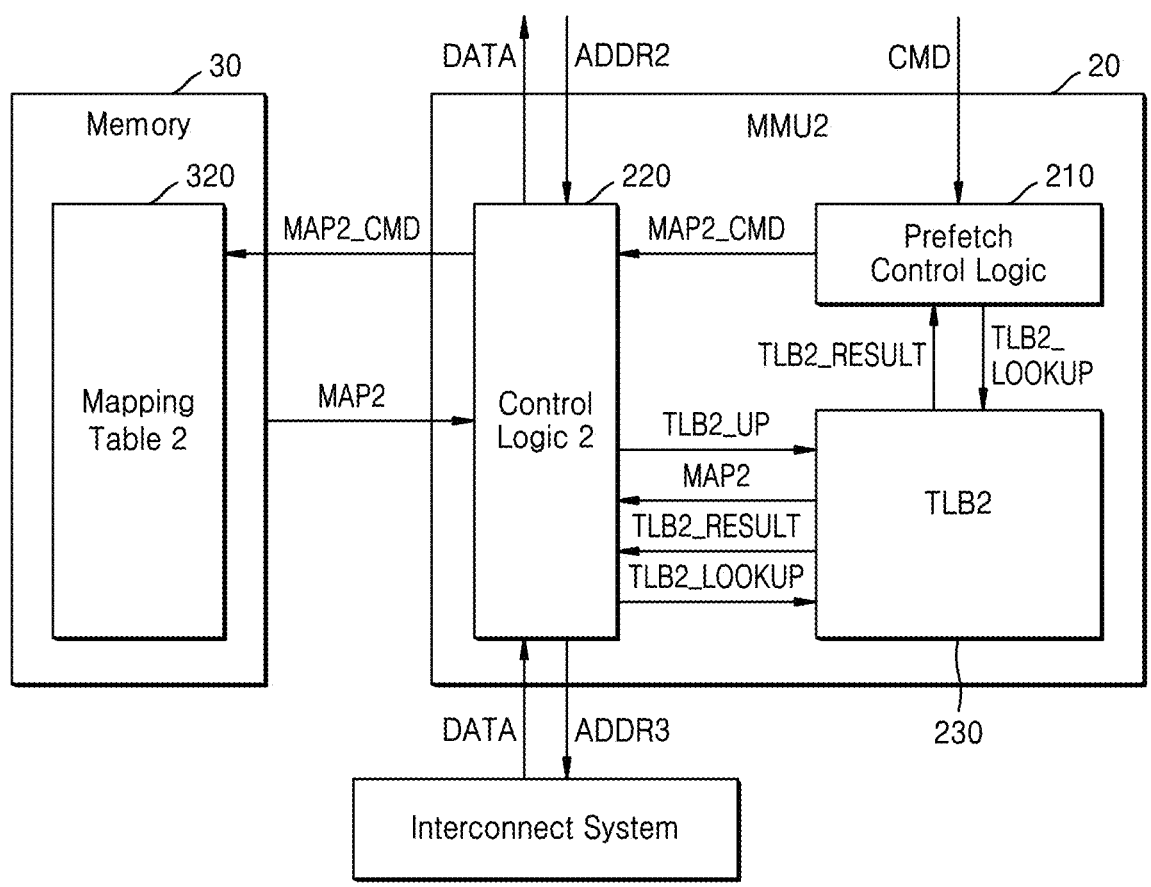
FIG. 12 is a block diagram illustrating a second MMU according to at least some example embodiments of the inventive concepts.

FIG. 12 is a block diagram illustrating the second MMU 20 according to at least some example embodiments of the inventive concepts.

Referring to FIG. 12, when receiving a translation request with respect to the second read target address ADDR2, the second MMU 20 may translate the second read target address ADDR2 to the third read target address ADDR3 and provide the third read target address ADDR3 to an interconnect system. The second MMU 20 according to at least some example embodiments of the inventive concepts may receive a prefetch command CMD separately from the translation request for the second read target address ADDR2 and perform an update on an address block.

The second MMU 20 according to at least some example embodiments of the inventive concepts may include the prefetch control logic 210, the second control logic 220, and the second translation lookaside buffer 230. The second MMU 20 may receive the second read target address ADDR2 from the first MMU 10 and may output the third read target address ADDR3 based on the second mapping information MAP2 with respect to the received second read target address ADDR2. The second control logic 220 may perform a lookup operation on the received second read target address ADDR2 and may receive a result of the lookup operation. For example, the second control logic 220 may output a lookup signal TLB2_LOOKUP to the second translation lookaside buffer 230, and receive result information TLB2_RESULT based on the lookup signal TLB2_LOOKUP to determine whether the second mapping information MAP2 is stored in the second translation lookaside buffer 230.

When the second control logic 220 determines that the second mapping information MAP2 is stored in the second translation lookaside buffer 230, the second control logic 220 may generate the third read target address ADDR3 by loading the second mapping information MAP2 from the second translation lookaside buffer 230. The second control logic 220 may transmit the generated third read target address ADDR3 to an interconnect system, and by receiving data DATA from at least one memory cell accessed based on the third read target address ADDR3, the second control logic 220 may transmit the data DATA to the interconnect sub-system.

When the second control logic 220 determines that the second mapping information MAP2 is not stored in the second translation lookaside buffer 230, the second control logic 220 may receive the second mapping information MAP2 from the memory device 30 to output the third read target address ADDR3. The second control logic 220 that has received the second mapping information MAP2 from the memory device 30 may transmit update information TLB2_UP related to the second mapping information MAP2, to the second translation lookaside buffer 230. The update information TLB2_UP may include the second mapping information MAP2 with respect to the second read target address ADDR2 requested to be translated, in the second translation lookaside buffer 230, and when available space to store the second mapping information MAP2 in the second translation lookaside buffer 230 is insufficient, the second control logic 220 may store the second mapping information MAP2 instead of any one piece of existing mapping information. That is, the second control logic 220 may perform an update operation in response to a case in which the second mapping information MAP2 with respect to the second read target address ADDR2 requested to be translated does not exist in the second translation lookaside buffer 230, and may not perform an update operation when the second mapping information MAP2 is stored.

The prefetch control logic 210 may receive a prefetch command CMD from the first MMU 10, and determine whether the second mapping information MAP2 with respect to an address block of the prefetch command CMD is stored in the second translation lookaside buffer 230. For example, the prefetch control logic 210 may output the lookup signal TLB2_LOOKUP to the second translation lookaside buffer 230, and receive the result information TLB2_RESULT based on the lookup signal TLB2_LOOKUP to determine whether the second mapping information MAP2 with respect to the address block is stored in the second translation lookaside buffer 230.

The prefetch control logic 210 may determine whether the second mapping information MAP2 with respect to at least one intermediate physical address included in the address block is stored in the second translation lookaside buffer 230, and may generate a mapping information request command MAP2_CMD based on a result of determining. The mapping information request command MAP2_CMD may be a command for requesting the second mapping information MAP2 from a second mapping information table 320 of the memory device 30 storing pieces of the second mapping information MAP2. When it is determined that the second mapping information MAP2 is not stored in the second translation lookaside buffer 230, the prefetch control logic 210 may provide the mapping information request command MAP2_CMD to the second control logic 220, and the second control logic 220 may provide the mapping information request command MAP2_CMD to the memory device 30, thereby receiving the second mapping information MAP2. Referring to at least some example embodiments of the inventive concepts of FIG. 9, when the second MMU 20 receives the prefetch command CMD with respect to the address block corresponding to the zeroth through third sub-lines 132a through 132d, the prefetch control logic 210 may determine whether the pieces of second mapping information MAP2 with respect to four intermediate physical addresses are stored in the second translation lookaside buffer 230. When the prefetch control logic 210 determines that second mapping information MAP2 of an intermediate physical address corresponding to the third sub-line 132d from among the four intermediate physical addresses is not stored in the second translation lookaside buffer 230, the prefetch control logic 210 may request from the memory device 30 the second mapping information MAP2 of the intermediate physical address corresponding to the third sub-line 132d.

The second control logic 220 and the prefetch control logic 210 may be configured as different hardware components from each other, but at least some example embodiments of the inventive concepts are not limited thereto, and they may also be configured as a single hardware component. For example, when receiving a translation request with respect to the second read target address ADDR2, the second control logic 220 of the second MMU 20 may output the third read target address ADDR3, and when receiving the prefetch command CMD, the second control logic 220 may provide update information on the address block to the second translation lookaside buffer 230.

Accordingly, the second MMU 20 according to at least some example embodiments of the inventive concepts may store the second mapping information MAP2 of intermediate physical addresses included in the address block, in the second translation lookaside buffer 230 in advance, and may quickly load the second mapping information MAP2 with respect to an intermediate physical address having a high access frequency possibility in a subsequent address translation operation.

Referring to FIGS. 6 and 12, the first MMU 10 according to at least some example embodiments of the inventive concepts may output the second read target address ADDR2 with respect to the first read target address ADDR1 requested to be translated, and may output a prefetch command CMD with respect to the address block including the second read target address ADDR2, separately from the second read target address ADDR2. The second MMU 20 that has received the prefetch command CMD may determine whether the second mapping information MAP2 with respect to the intermediate physical address included in the address block is stored in the second translation lookaside buffer 230, and when the second mapping information MAP2 is not stored in the second translation lookaside buffer 230, the second MMU 20 may store the second mapping information MAP2 with respect to the address block, thereby reducing a waiting time for loading the second mapping information MAP2 in a subsequent operation.

Figure 13:
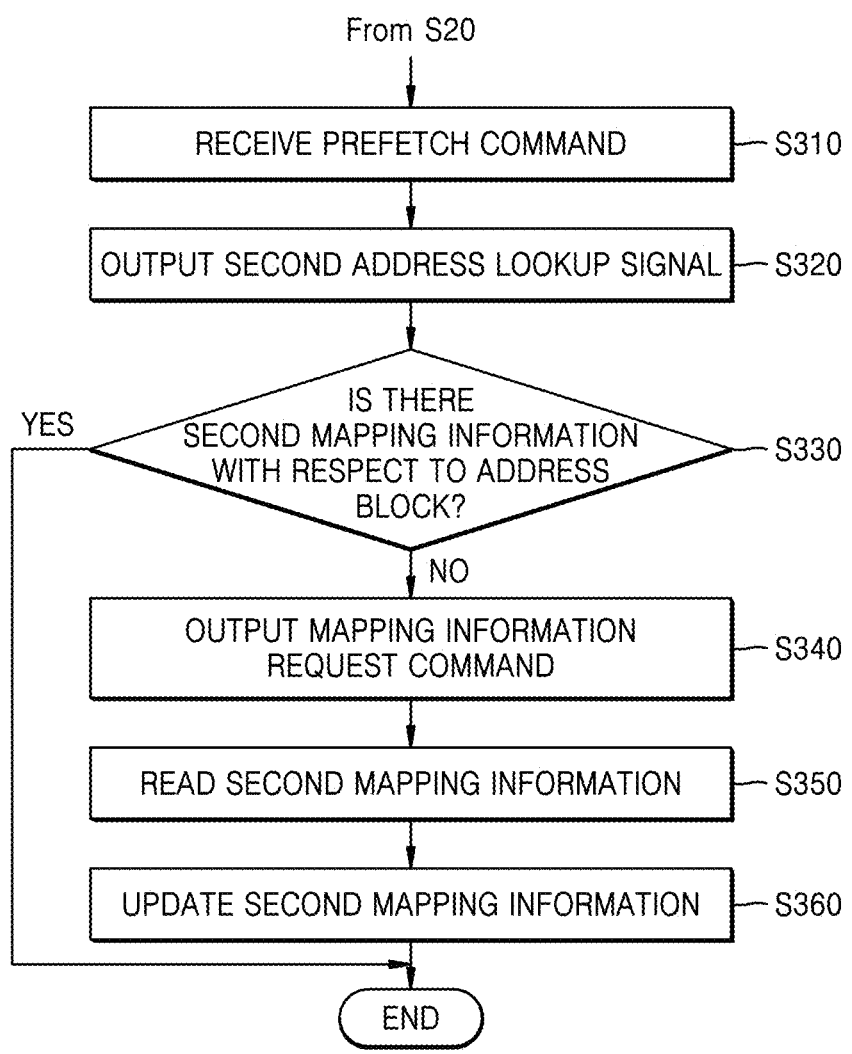
FIG. 13 is a flowchart of an operating method of the second MMU according to at least some example embodiments of the inventive concepts of FIG. 12.

FIG. 13 is a flowchart of an operating method of the second MMU 20 according to at least some example embodiments of the inventive concepts of FIG. 12.

Referring to FIG. 13, the second MMU 20 may determine whether an intermediate physical address included in an address block is stored in the second translation lookaside buffer 230, and may update the second translation lookaside buffer 230 by reading the second mapping information MAP2 based on a result of the determining.

In operation S310, the second MMU 20 may receive a prefetch command CMD with respect to the address block from the first MMU 10. In operation S320, the prefetch control logic 210 that has received the prefetch command CMD with respect to the address block may output, to the second translation lookaside buffer 230, a lookup signal for TLB2_LOOKUP for detecting the second mapping information MAP2 with respect to the intermediate physical address. For example, the prefetch control logic 210 that has received an address block including a plurality of intermediate physical addresses may output a lookup signal TLB2_LOOKUP with respect to each of the plurality of intermediate physical addresses.

In operation S330, the prefetch control logic 210 may determine whether the second mapping information MAP2 corresponding to the address block is stored in the second translation lookaside buffer 230 based on result information TLB2_RESULT with respect to the lookup signal TLB2_LOOKUP. When the prefetch control logic 210 receives an address block including a plurality of intermediate physical addresses, the prefetch control logic 210 may detect intermediate physical addresses that are not stored in the second translation lookaside buffer 230 from among the intermediate physical addresses based on the result information TLB2_RESULT with respect to each of the plurality of intermediate physical addresses. The prefetch control logic 210 may end an operation without performing an update operation on the intermediate physical addresses stored in the second translation lookaside buffer 230.

In operation S340, the prefetch control logic 210 may provide, to the second control logic 220, a mapping information request command MAP2_CMD for requesting the second mapping information MAP2 with respect to the intermediate physical addresses not stored in the second translation lookaside buffer 230. The second control logic 220 may transmit the mapping information request command MAP2_CMD to the memory device 30 in which the second mapping information table 320 is stored. In operation S350, the second MMU 20 may read the second mapping information MAP2 by transmitting the mapping information request command MAP2_CMD with respect to the second mapping information MAP2, to the memory device 30. Accordingly, the second MMU 20 may obtain the second mapping information MAP2 with respect to the intermediate physical addresses, of which the second mapping information MAP2 is not stored in the second translation lookaside buffer 230 from among the intermediate physical addresses of the address block. In operation S360, the second MMU 20 may store the second mapping information MAP2 with respect to the intermediate physical addresses of the address block, as the second control logic 220 updates the second mapping information MAP2 to the second translation lookaside buffer 230.

Figure 14:
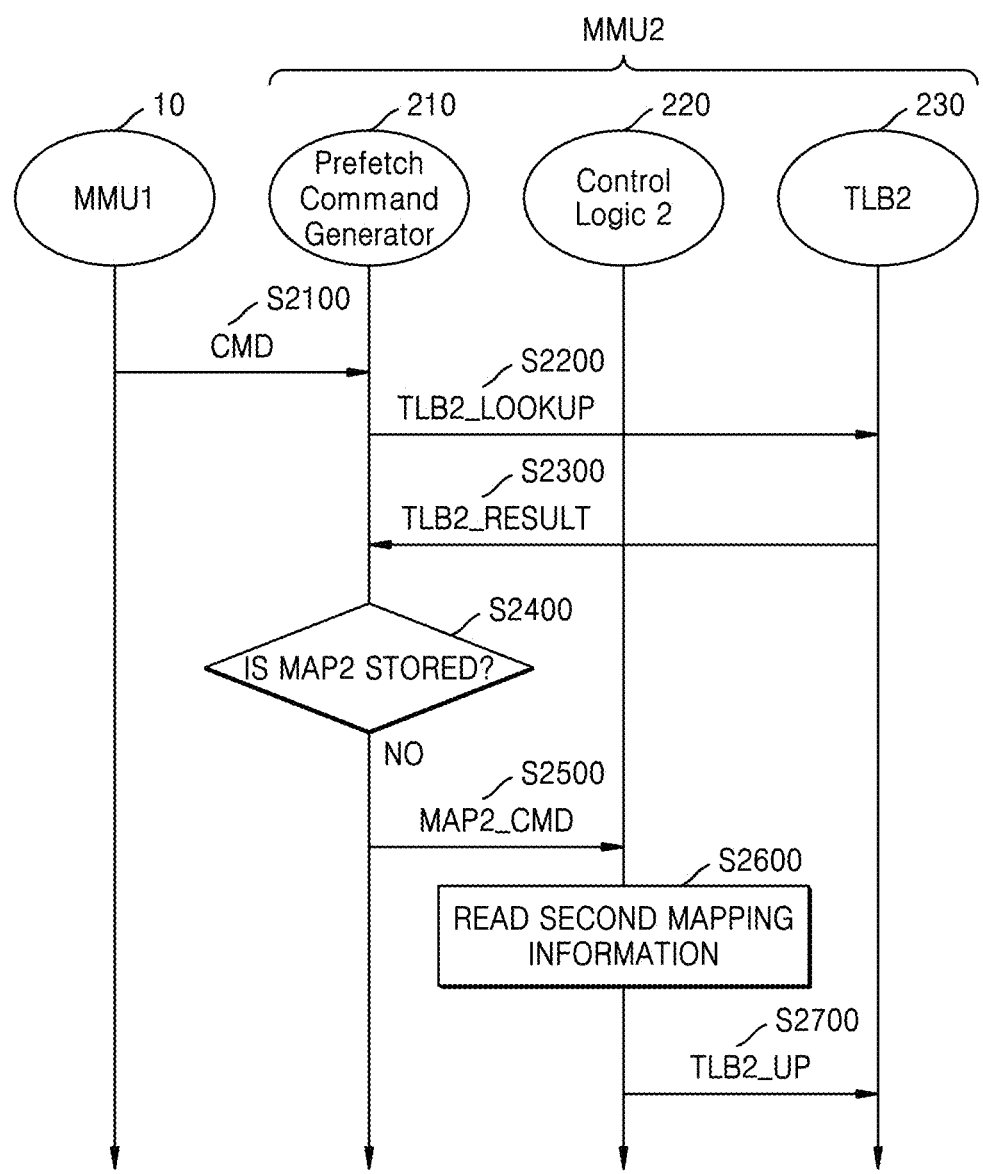
FIG. 14 is a flowchart of a method of updating mapping information with respect to a prefetch target address, by a second MMU, according to at least some example embodiments of the inventive concepts.

FIG. 14 is a flowchart of a method of updating mapping information with respect to a prefetch target address, by the second MMU 20 according to at least some example embodiments of the inventive concepts.

Referring to FIG. 14, in response to receiving a prefetch command CMD from the first MMU 10, the second MMU 20 according to at least some example embodiments of the inventive concepts may store the second mapping information MAP2 of an address block corresponding to the prefetch command CMD, in the second translation lookaside buffer 230. In operation S2100, the prefetch control logic 210 may receive the prefetch command CMD from the second MMU 20. In operation S2200, the prefetch control logic 210 may provide a lookup signal TLB2_LOOKUP with respect to an intermediate physical address of the address block corresponding to the prefetch command CMD to the second translation lookaside buffer 230, and in operation S2300, the prefetch control logic 210 may receive result information TLB2_RESULT with respect to the intermediate physical address from the second translation lookaside buffer 230. For example, when the address block includes a plurality of intermediate physical addresses, the prefetch control logic 210 may provide a lookup signal TLB2_LOOKUP with respect to each of the intermediate physical addresses to the second translation lookaside buffer 230, thereby detecting intermediate physical addresses not included in the second translation lookaside buffer 230 from among the intermediate physical addresses included in the address block.

In operation S2400, the prefetch control logic 210 may determine whether the second mapping information MAP2 is stored in the second translation lookaside buffer 230 based on the result information TLB2_RESULT with respect to the intermediate physical addresses, and may end an operation without performing an update operation on intermediate physical addresses, of which the second mapping information MAP2 is stored in the second translation lookaside buffer 230. In operation S2500, the prefetch control logic 210 may provide, to the second control logic 220, the second mapping information request command MAP2_CMD with respect to the intermediate physical addresses, of which the second mapping information MAP2 is not stored in the second translation lookaside buffer 230. In operation S2600, the second control logic 220 may read the second mapping information MAP2 with respect to an intermediate physical address corresponding to the received mapping information request command MAP2_CMD from the memory device 30 storing the second mapping information table 320. In operation S2700, the second control logic 220 may end the update operation of the second mapping information MAP2 by providing the read second mapping information MAP2 to the second translation lookaside buffer 230.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An address translation method for accessing a memory, the address translation method comprising:
   outputting a prefetch command in response to an update of mapping information on a first read target address, the update occurring in a first translation lookaside buffer circuit storing first mapping information between a first address and a second address; and
   storing, in response to the prefetch command, second mapping information, with respect to at least some addresses of an address block including a second read target address mapped to the first read target address, in a second translation lookaside buffer circuit, the second mapping information including mapping information between the second address and a third address.

2. The address translation method of claim 1, further comprising:
   translating the first read target address to the second read target address.

3. The address translation method of claim 1, further comprising:
   determining, in response to a translation request being made with respect to the first read target address, whether the first mapping information stored in the first translation lookaside buffer circuit includes the mapping information on the first read target address; and
   performing the update of the mapping information on the first read target address in response to the first mapping information stored in the first translation lookaside buffer circuit not including the mapping information on the first read target address,
   wherein the mapping information on the first read target address is mapping information between the first read target address and the second read target address, and
   wherein the outputting of the prefetch command includes outputting the prefetch command after the mapping information on the first read target address is updated.

4. The address translation method of claim 1, wherein the outputting of a prefetch command includes generating a prefetch command with respect to the address block based on an address tag corresponding to the first read target address.

5. The address translation method of claim 4, wherein the address tag includes an indicator designating a location where an update of the first mapping information is conducted in the first translation lookaside buffer circuit.

6. The address translation method of claim 5, wherein the address block comprises a data block including peripheral second addresses of the second read target address corresponding to the address tag.

7. The address translation method of claim 1, wherein the storing of second mapping information in the second translation lookaside buffer circuit comprises:
   detecting, in response to the prefetch command, the second address, the second address being an address of the address block.

8. The address translation method of claim 7, wherein the storing of the second mapping information in the second translation lookaside buffer circuit comprises:
   generating a mapping information request command with respect to a prefetch target address, of which mapping information is not included in the second mapping information stored in the second translation lookaside buffer circuit.

9. The address translation method of claim 8, wherein the storing of the second mapping information in the second translation lookaside buffer circuit comprises:
   reading second mapping information with respect to the prefetch target address from a second mapping information table in response to the mapping information request command; and
   updating the read second mapping information to the second translation lookaside buffer circuit.

10. An address translation system comprising:
    a first memory management unit (MMU) circuit configured to output a prefetch command in response to an update of mapping information on a first read target address, the update occurring in a first translation lookaside buffer circuit storing first mapping information between a first address and a second address; and
    a second MMU circuit configured to store, in response to the prefetch command, second mapping information with respect to at least some addresses of an address block including a second read target address mapped to the first read target address, in a second translation lookaside buffer circuit, the second mapping information including mapping information between the second address and a third address.

11. The address translation system of claim 10, wherein the first MMU circuit is further configured to determine, in response to a translation request being made with respect to the first read target address, whether the first mapping information stored in the first translation lookaside buffer circuit includes the mapping information on the first read target address, and perform the update on the mapping information on the first read target address in response to the first mapping information stored in the first translation lookaside buffer circuit not including the mapping information on the first read target address,
    wherein the mapping information on the first read target address is mapping information between the first read target address and the second read target address, and
    wherein the outputting of the prefetch command includes outputting the prefetch command after the mapping information on the first read target address is updated.

12. The address translation system of claim 10, wherein the first MMU circuit is further configured to generate a prefetch command with respect to the address block based on an address tag corresponding to the first read target address.

13. The address translation system of claim 12, wherein the address tag includes an indicator designating a location where an update of the first mapping information is conducted in the first translation lookaside buffer circuit.

14. The address translation system of claim 13, wherein the address block includes a data block including peripheral second addresses of the second read target address corresponding to the address tag.

15. The address translation system of claim 10, wherein the second MMU circuit is further configured to detect, in response to the prefetch command, a second address of the address block.

16. The address translation system of claim 15, wherein the second MMU circuit is further configured to generate a mapping information request command with respect to a prefetch target address, of which mapping information is not included in the second mapping information stored in the second translation lookaside buffer circuit.

17. The address translation system of claim 16, wherein the second MMU circuit is further configured to read, in response to the mapping information request command, second mapping information with respect to the prefetch target address from a second mapping information table, and update the read second mapping information to the second translation lookaside buffer circuit.

18. A system-on-chip comprising:
a first translation lookaside buffer circuit storing at least some pieces of first mapping information between a first address and a second address;
a second translation lookaside buffer circuit storing at least some pieces of second mapping information between the second address and a third address;
a prefetch command generation circuit configured to output a prefetch command in response to receiving update information for updating the first mapping information between a first read target address and a second read target address, to the first translation lookaside buffer circuit; and
a prefetch control logic circuit configured to provide, in response to the prefetch command, a lookup signal with respect to an address block including the second read target address, to the second translation lookaside buffer circuit.

19. The system-on-chip of claim 18, further comprising:
a first control logic circuit configured to determine, in response to a translation request being made with respect to the first read target address, whether the first mapping information with respect to the first read target address is stored in the first translation lookaside buffer circuit, and perform an update on the first read target address in response to the first mapping information with respect to the first read target address not being stored in the first translation lookaside buffer circuit,
wherein the prefetch command generation circuit is configured to output the prefetch command after the first mapping information between a first read target address and a second read target address is updated.

20. The system-on-chip of claim 18, wherein the prefetch command generation circuit is further configured to generate a prefetch command with respect to the address block based on an address tag corresponding to the first read target address.

* * * * *